United States Patent [19]
Bergmann

[11] Patent Number: 5,590,140
[45] Date of Patent: Dec. 31, 1996

[54] CLOCK RECOVERY EXTRAPOLATION

[75] Inventor: Ernest E. Bergmann, Fountain Hill, Pa.

[73] Assignee: Lucent Technologies Inc., Murray Hill, N.J.

[21] Appl. No.: 367,382

[22] Filed: Dec. 30, 1994

[51] Int. Cl.$^6$ .................................................. H04L 7/00
[52] U.S. Cl. ............................................ 371/61; 370/516
[58] Field of Search ............................. 371/47.1, 61, 62; 370/100.1, 101, 104.1, 105.1, 105.2, 105.3; 375/354, 355, 359, 362, 371; 455/51.5

[56] References Cited

U.S. PATENT DOCUMENTS

| | | | |
|---|---|---|---|
| 3,566,267 | 2/1971 | Golding | 370/104.1 |
| 3,641,274 | 2/1972 | Sasaki et al. | 370/104.1 |
| 3,798,650 | 3/1974 | McComas et al. | 375/371 |
| 4,631,738 | 12/1986 | Betts et al. | 375/345 |
| 4,831,637 | 5/1989 | Lawrence et al. | 375/371 |
| 4,977,580 | 12/1990 | McNicol | 375/344 |
| 5,115,452 | 5/1992 | Cupo | 375/232 |
| 5,177,740 | 1/1993 | Toy et al. | 370/100.1 |
| 5,259,005 | 11/1993 | LaRosa et al. | 375/355 |
| 5,260,975 | 11/1993 | Saito | 375/327 |
| 5,463,627 | 10/1995 | Matsuoka et al. | 370/105.1 |

*Primary Examiner*—Stephen M. Baker
*Attorney, Agent, or Firm*—Richard D. Laumann

[57] ABSTRACT

Data recovery is simplified when there is a known interval between packets by using the information about time between packet starts to adjust the receiver clock rather relying solely on the information conveyed by the received bits. Information about packet length may also be used.

4 Claims, 2 Drawing Sheets

RECEIVING PACKET

TIME ⟶

RECEIVING PACKET

TIME ⟶

CLOCK RECOVERY EXTRAPOLATION

TECHNICAL FIELD

This invention relates generally to the field of data recovery and particularly to the field of data recovery that uses clock extrapolation.

BACKGROUND OF THE INVENTION

The telecommunications industry presently transmits digital information; that is, data in the form of bits representing either 0s or 1s, over both copper wires and optical fibers, as well as using free space, using many different types of systems to encode and decode the information in many different types of topologies. Although the details of these systems differ, a problem faced by all of the systems is how to accurately receive the transmitted data; that is, the receiver must be able to accurately distinguish 0s and 1s. Reception of the data is complicated because the data may arrive with unknown amplitude and at an unspecified time.

Techniques have been developed to enable the receiver to accurately detect 0s and 1s. For example, the packet may begin with a predetermined sequence of bits which is commonly referred to as the preamble or training sequence. The receiver uses the preamble to align its clock with the transmit clock and to make any necessary adjustments in threshold so that 1s are received with the proper amplitude. Other techniques detect the first pulse by looking for rising or falling edges and then making the necessary clock and threshold adjustments. These techniques are applicable to a wide variety of transmission protocols.

There are communications systems in which data transmission is asymmetric; that is, a system in which one station effectively controls the system. Different terminology is used to represent the stations in such systems. For example, central office or master station may be used with one type of station and local or slave station may be used with the other type of station. In such a system, the master station or central office may send and receive packets of known duration at known intervals; usually there is one master station and a plurality of slave stations. The central office tells the local stations when and for how long they may transmit. Such a system is used in applications such as present and contemplated future fiber-to-the-home systems. Typical data recovery techniques used in these systems are exemplified by those described in the previous paragraph.

SUMMARY OF THE INVENTION

According to an exemplary embodiment of this invention, data recovery of data transmitted within a known time interval is effected by extrapolating clock corrections made by the receiver from one interval to a succeeding interval. In one embodiment, the clock corrections are determined simply by scaling the clock corrections for the portion of the interval during which data is transmitted to the entire interval or by using a look up table. The method is especially advantageously used in a system with one station having a very accurate clock located at, for example, the central office, and the local stations having less accurate clocks. The local stations adjust their clocks to the data received from the central office and the central office station with the accurate clock adjusts the incoming data from the local stations to its clock.

DETAILED DESCRIPTION

Figure 1:
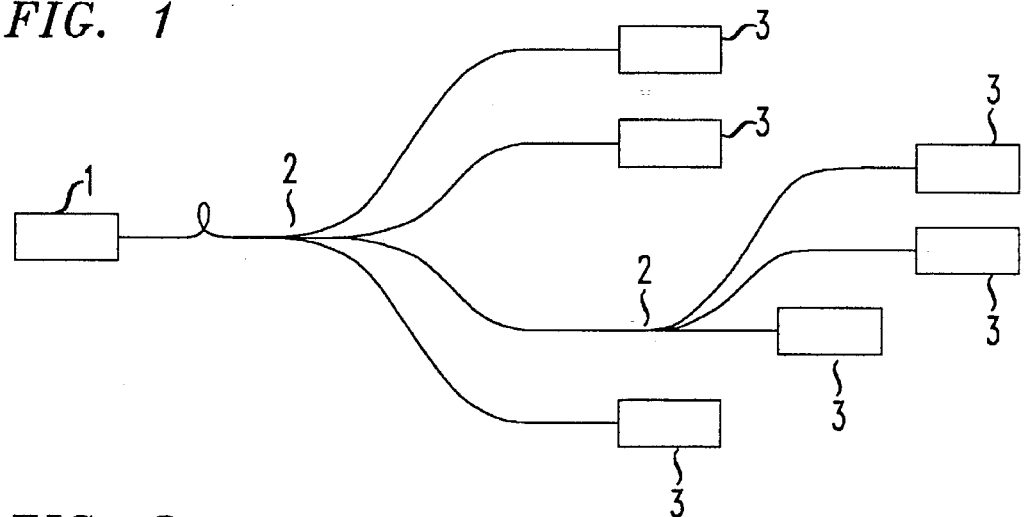
FIG. 1 is a schematic depiction of a communications system using data recovery according to this invention.

FIG. 1 schematically depicts a telecommunications system that may use the data recovery method of this invention. Depicted are central office 1 and a plurality of local stations 3. The central office and the local stations are connected by means of a transmission media such as optical fibers. The central office and the local stations receive and transmit data between the central office and the local stations; no data is exchanged directly between local stations. The outgoing signal from central office 1 is split at signal splitter/combiner 2 for distribution to the plurality of local stations 3; the signals from the plurality of local stations 3 are combined by signal splitter/combiner 2 to form a combined signal which will be received by central office 1. In addition to the stations and the transmission media depicted, the system will have other components that are not depicted for reasons of clarity.

Each station will also have a clock. The central office clock is typically more accurate than are the local station clocks. The central office clock is the clock that ultimately controls system operation; that is, the data recovery process at each local station results in a clock at the local station that closely tracks the central office clock and which is used to time the transmission of information packets back to the central office. The central office will still need to choose an appropriate data delay for each incoming packet when it performs data recovery.

The stations comprise a plurality of components, such as transmitters and receivers including light sources and photodetectors, that are well known to those skilled in the art except for the clock extrapolation apparatus which is new in this invention. All components will be readily fabricated after consideration of the following.

Figure 2:
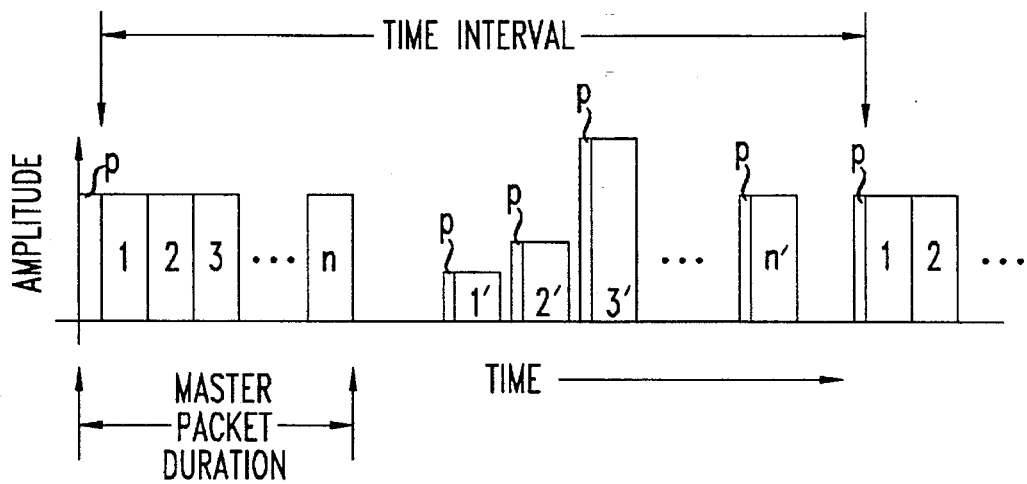
FIG. 2 is a representation of data including data within a single time interval.

FIG. 2 is a representation of the data sent by the central office which includes a single time interval. The interval contains a super packet containing information sections #1, #2, . . . , #n which are destined for individual local stations #1, #2, . . . , #n. Information sections #1', #2', . . . , #n' are received by the central office from the individual local stations. Each packet and super packet will have a preamble, a start delimiter, and data, and occupies a known time interval. It is, of course, possible that a station, be it a central or local station, may send a plurality of packets and/or super packets during an interval. For reasons of clarity, one super packet sent to and one packet sent by each local station has been assumed. The packets received by the master station have varying amplitude and may have varying duration. The entire time interval is not full of information packets; that is, there are times when the master station and the local stations are not transmitting. The start of each packet and super packet includes a preamble and start delimiter which is indicated by "p".

The duration of the time interval does not change with time; that is, the time from the beginning of a first interval to the beginning of a second interval is constant. That is, the time interval is a fixed number of clock cycles with respect to the master station's clock.

This invention resides in the realization that data recovery is facilitated by using information about the central office packet repetition rate; that is, the known time interval for transmission and reception of successive data packets, in the data recovery process. At the local station, the clock adjustment made during a portion of a first interval; that is, the interval while the central office transmits its super packet, in which data is received is extrapolated to the second interval; that is, the interval between transmissions of the central office. At the central office, the clock is fixed and the phase of the received data is extrapolated from the data of a first packet from a particular local station in a given time interval to the next packet from that same local station in a second time interval. The extrapolations by the master station for the individual slave stations will generally differ from each other; that is, the master station will determine the best phase for each slave station depending upon previous packets from the local station. The local station modifies its clock to conform to the master clock. The packet from the local station to the master station has the appropriate frequency and the master station need adjust only the phase.

Figure 3:
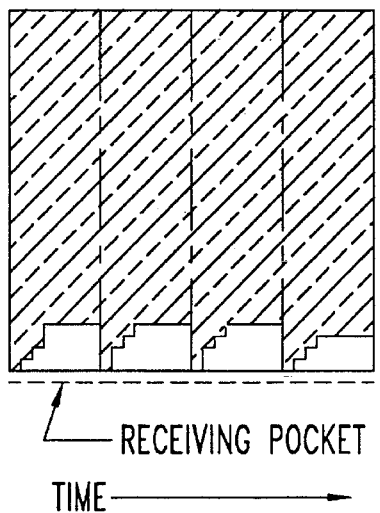
FIGS. 3–5 are useful in explaining data recovery according to this invention.
Figure 4:
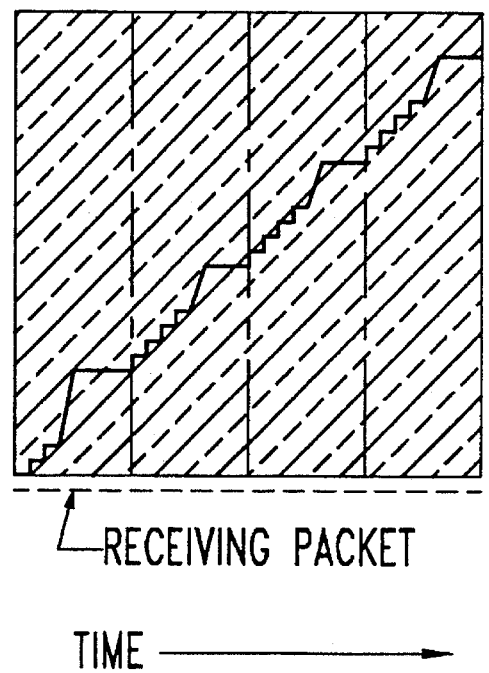
Figure 5:
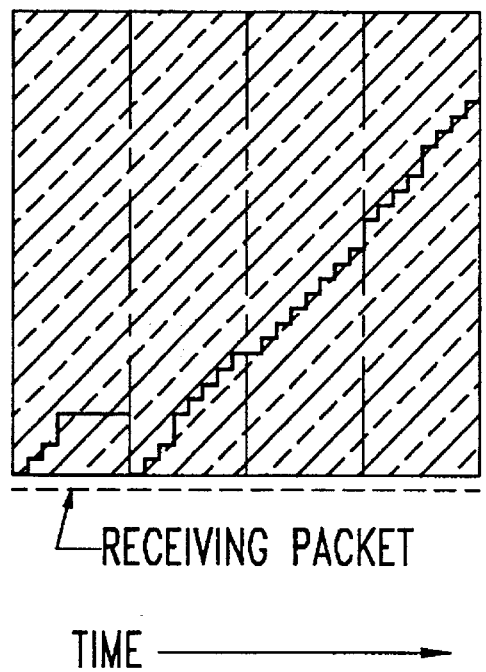

The invention will be better understood from consideration of FIGS. 3–5 which plot time horizontally versus phase vertically. The units are arbitrary. The 45 degree lines are not unique but were chosen for reasons of explanation. The 45 degree line represents one clock cycle difference between transmitter clock and the local station's uncorrected local clock per time interval; different slopes correspond to possible frequency differences. For example, the slope might be 30 degrees or be 60 degrees or even be negative. Each figure shows a sequence of super packets arriving at regular intervals with the super packet having a length that is approximately equal to half of the repetition rate. The horizontal lines indicate the length of each super packet. The super packet length should be approximately half the time interval to use the simple method described later in connection with FIG. 4. The assumption is made that the transmit and receive uncorrected clocks are designed to have equal frequencies, but they inadvertently differ slightly in frequency. The method of this invention will also work if there is no difference in frequency. This slight frequency difference is indicated by the dotted lines that represent the phase of the transmitter's clock With respect to the steady, (uncorrected) local station clock. FIG. 3 illustrates a prior art technique in which the receiver clock simulates the transmitter clock albeit approximately within the limits of quantized phase choices. However, when the packet stops, the receiver clock recovery circuit receives no further information. Accordingly, the phase stops changing and becomes horizontal; that is, follows the steady local station clock, as shown. When the next packet arrives, the receiver clock recovery circuit matches the phase of the next packet as shown. However, the recovered clock has dropped a full clock cycle with respect to the master clock. Note that whenever the trace jumps from one 45 degree line to another 45 degree line, a cycle of transmitted clock phase has been slipped. The 45 degree lines are clock cycles of the transmitting clock with respect to the receiver's uncorrected clock.

FIG. 4 shows data recovery using an extrapolation technique according to this invention. It is assumed that the packet is received for approximately half of the repetition interval. An up down counter is used to count the number and direction of phase steps during packet reception. Immediately after the packet finishes, the timing circuit adds a number of phase steps in the same direction similar to the number already made during the reception of the packet. A more sophisticated variation of this technique uses the duty cycle correction, rather than a simple approximation, to modify the number of counts of phase steps to obtain a better extrapolation. This variation reduces the needed correction in phase when the next packet arrives.

A still more sophisticated variation which uses knowledge of the number of clock cycles in the packet together with a look up table to drive a count down oscillator will be described in some detail. This variation produces a phase change with time as shown in FIG. 5. The entries in the look up table are selected from the number of phase changes recorded in the subsequently discussed up down counter. The count down oscillator is loaded with a count and then counts down at the clock rate until 0 is reached. At this time, it provides a phase change in the clock output and reloads the count. This approach provides periodic phase changes added to the clock at a desired rate. The use of a count down oscillator will be understood as being very specific and other techniques for determining the interval between phase corrections will be readily thought of. For example, a count up oscillator could be used. Analog means could also be used.

Yet another approach can be used to obtain the phase change depicted in FIG. 5. This approach relies only upon the known constancy of the packet repetition rate and does not require knowledge of the packet length. A discrepancy counter is used to count the number of clock cycles between successive packet synchronization marks. The discrepancy between the proper count and the actual count is noted as is the number of phase changes between the start delimiter of the first packet and the start delimiter in the second packet. A look up table uses the count disparity and the phase steps to provide a preset count and phase direction for the count down oscillator which reloads after every seen phase step. When the packet ends, no more phase steps are seen and the count down oscillator is able to count down to 0; so phase steps are caused solely from the count down oscillator. In other words, the only phase steps produced are from the count down oscillator until the next packet arrives. The cycle discrepancy counter should find no disparity in the total number of elapsed clock cycles between preset synchronization marks. It should be noted that this method becomes effective only after reception of the second packet.

A relatively simple discrepancy counter can also be used when the disparity between the counts between synchronization marks and the nominal value is known to be small. For example, if we know that under the worst case possibility the disparity is never expected to be greater than +/–2 clock cycles, a a three bit counter counting 0, 1, 2, 3, 4, 6, 7, 0, 1, . . . can be used. If the count starts at 0, it should also end at 0 for a time interval that is an exact multiple of 8 clock cycles. If there is a discrepancy of –2, then the counter will end at 6. If there is a discrepancy of +2, then the counter will end at 2, and so forth. In this embodiment, the three bits of the counter together with the up down counts of phase changes are sufficient to drive the look up table.

The circuit needed to implement the described embodiments of the method of this invention will be readily fabricated by those skilled in the art using conventional and known components. A detailed description is not required.

Variations in the embodiment described will be readily thought of by those skilled in the art. For example, systems other than the system depicted in FIG. 1 may use the data recovery method of this invention. The system need not be an optical communications system.

I claim:

1. A method of data recovery for data packets transmitted within specified time intervals comprising the steps of:

determining clock corrections while data is being received during one interval; and extrapolating said corrections to the next interval.

2. A method of data recovery as recited in claim 1 in which said determining is by:

scaling the clock corrections for the portion of the interval during which data is transmitted to the entire interval.

3. A method of data recovery as recited in claim 1 in which said determining is by using a look up table.

4. A method of data recovery as recited in claim 2 in which said determining is by using a look up table.

* * * * *